United States Patent
Vikberg et al.

(10) Patent No.: US 8,706,122 B2
(45) Date of Patent: Apr. 22, 2014

(54) CIRCUIT SWITCHED FALLBACK FOR MOBILE TERMINATED CALLS

(75) Inventors: Jari Tapio Vikberg, Järna (SE); John Walter Diachina, Garner, NC (US); Magnus Olsson, Stockholm (SE); Peter Östrup, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 719 days.

(21) Appl. No.: 12/865,424

(22) PCT Filed: Jan. 30, 2009

(86) PCT No.: PCT/IB2009/000163
§ 371 (c)(1),
(2), (4) Date: Jul. 30, 2010

(87) PCT Pub. No.: WO2009/095777
PCT Pub. Date: Aug. 6, 2009

(65) Prior Publication Data
US 2010/0331011 A1    Dec. 30, 2010

Related U.S. Application Data

(60) Provisional application No. 61/025,224, filed on Jan. 31, 2008.

(51) Int. Cl.
*H04W 40/00* (2009.01)
*H04W 36/00* (2009.01)
*H04W 24/00* (2009.01)

(52) U.S. Cl.
USPC .......................... 455/445; 455/439; 455/456.5

(58) Field of Classification Search
CPC ..... H04W 40/20; H04W 40/34; H04W 40/36; H04W 8/12; H04W 36/0055; H04W 36/0061; H04W 36/0077; H04W 64/00; H04W 64/003
USPC ................. 455/456.4, 445, 438, 439, 456.5
See application file for complete search history.

(56) References Cited

U.S. PATENT DOCUMENTS

| | | | | |
|---|---|---|---|---|
| 5,745,695 | A * | 4/1998 | Gilchrist et al. | 709/227 |
| 8,089,956 | B2 * | 1/2012 | Gu et al. | 370/354 |
| 8,213,419 | B2 * | 7/2012 | Zhu et al. | 370/356 |
| 2004/0184439 | A1 * | 9/2004 | Blanc et al. | 370/349 |
| 2010/0098023 | A1 * | 4/2010 | Aghili et al. | 370/331 |
| 2010/0302937 | A1 * | 12/2010 | Hu et al. | 370/225 |
| 2011/0090872 | A1 * | 4/2011 | Dahlen et al. | 370/332 |

OTHER PUBLICATIONS

3GPP TSG SA WG2 Meeting #62 Jan. 18, 2008, Huawei "CS Fallback solution with SRVCC Alt-E", whole document.

* cited by examiner

*Primary Examiner* — George Eng
*Assistant Examiner* — Nam Huynh (57) ABSTRACT

In order to prevent a mobile terminated (MT) call to a user equipment (UE) from being lost by addressing a Location Area/Tracking Area (LA/TA) mismatch problem that could occur during a circuit switched (CS) Fallback, the method comprises the steps of: receiving a paging message from a mobility management entity, MME, where the paging message identifies suitable location areas, the paging message is sent because a first mobile switching center, MSC1, received a MT call request for the UE; determining that there are no 2G/3G cells belonging to the suitable location areas based on a current location of the UE; identifying a target 2G/3G cell in a location area associated with the current location of the UE but not part of the 2G/3G cells belonging to the suitable location areas; and enabling a signaling connection to be established between the UE and the first MSC1 via a second mobile switching center, MSC2, where the second MSC2 interfaces with a base station controller, BSC2, or a radio network controller, RNC2, that manages the target 2G/3G cell, where the signaling connection allows the MT call to be established with the UE.

14 Claims, 8 Drawing Sheets

CIRCUIT SWITCHED FALLBACK FOR MOBILE TERMINATED CALLS

This application claims the benefit of U.S. Provisional Application No. 61/025,224, filed Jan. 31, 2008, the disclosure of which is fully incorporated herein by reference.

CLAIM BENEFIT OF PRIOR FILED U.S. APPLICATION

This application claims the benefit of U.S. Provisional Patent Application Ser. No. 61/025,224 entitled "CS Fallback for MT Calls: Solutions to the LA/TA Mismatch Problem" which was filed on Jan. 31, 2008, the contents of which are hereby incorporated by reference herein.

TECHNICAL FIELD

The present invention is related to a node and method for preventing a mobile terminated (MT) call to a user equipment (UE) from being lost. More specifically, the present invention is related to a node (e.g., enhanced eNodeB) and method (e.g., implemented by enhanced eNodeB) for preventing a MT call from being lost due to a Location Area/Tracking Area (LA/TA) mismatch problem that could occur during a circuit switched (CS) Fallback when the UE transitions from a SAE/LTE network to a GSM or UMTS network as a result of being notified of that MT call.

BACKGROUND

Figure 1:
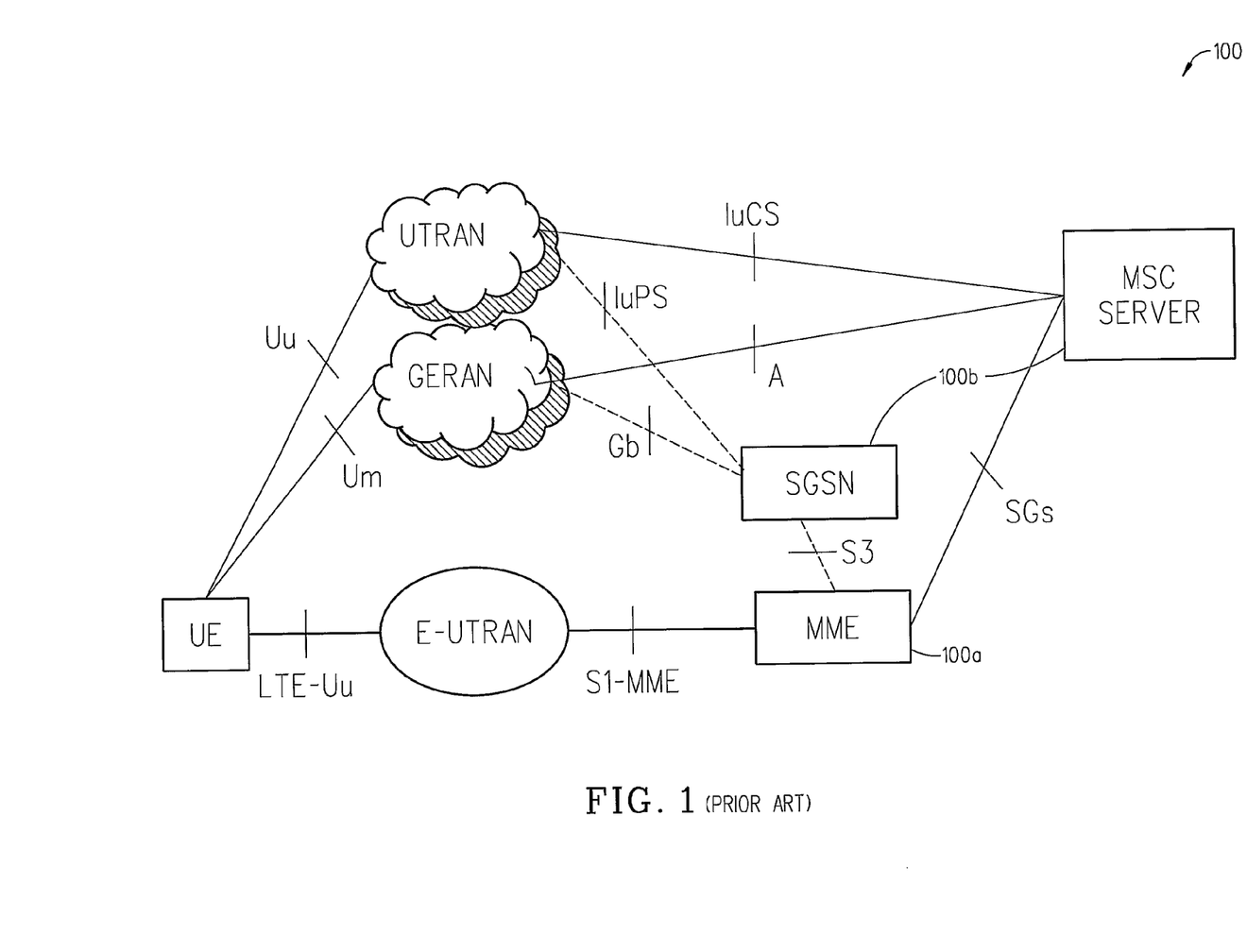
FIG. 1 (PRIOR ART) is a diagram of a mobile telecommunications network (including a SAE/LTE network and a GSM network) which has a reference architecture associated with CS Fallback in accordance with the standards 3GPP TS 23.002 and 3GPP TS 23.401.
Figure 2:
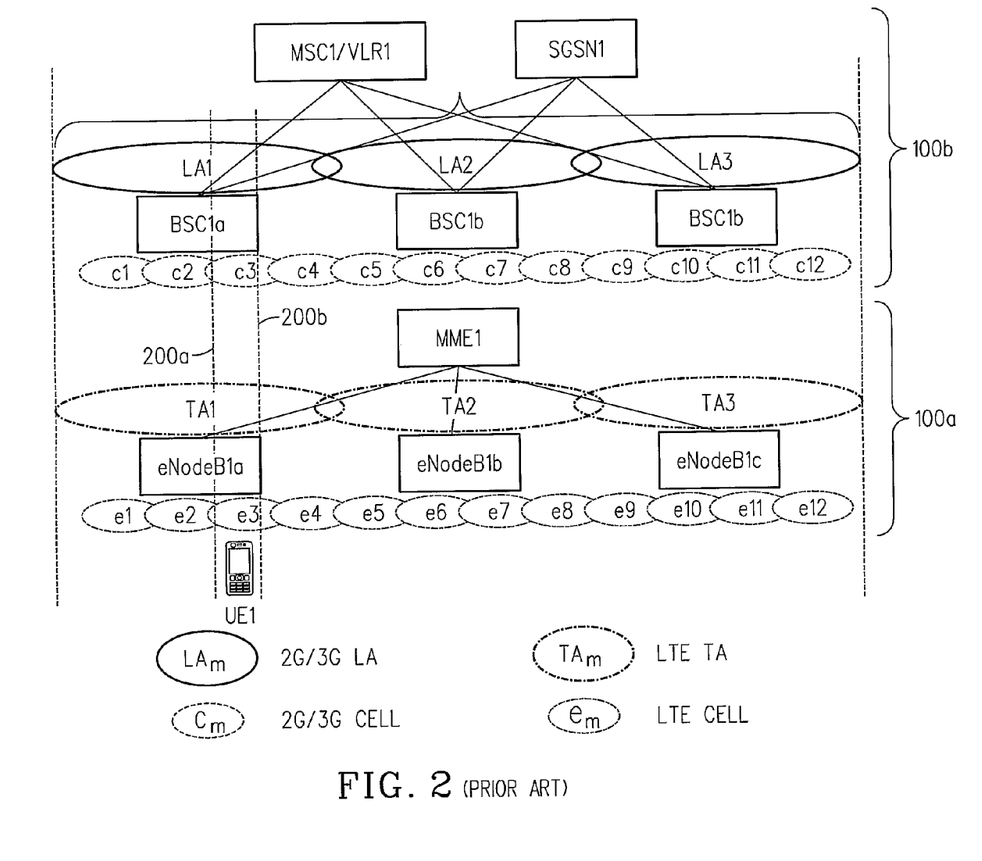
FIG. 2 (PRIOR ART) is a diagram used to illustrate one example of how the SAE/LTE network and the GSM network shown in FIG. 1 may provide overlapping coverage in one location.
Figure 3:
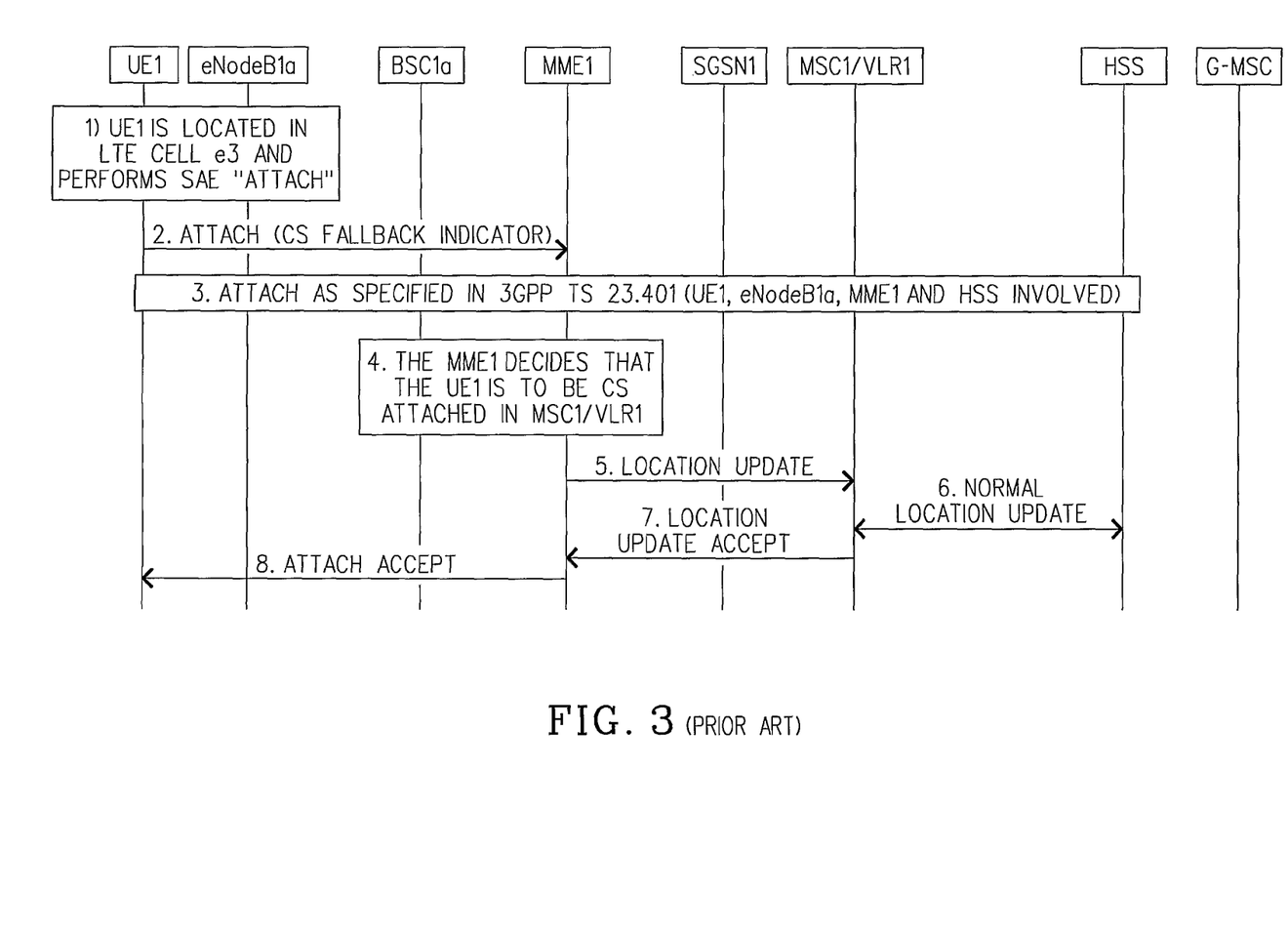
FIG. 3 (PRIOR ART) is a signal flow diagram that shows an example of how a UE would perform a SAE/LTE Attach to become attached for the PS domain and a CS Attach to become attached for the CS domain based on the situation that is shown in FIG. 2.

The following terms and abbreviations are herewith defined, at least some of which are referred to within the following description of the prior art and the present invention. It should be noted that the reference to the "present invention" or "invention" used herein relates to exemplary embodiments and not necessarily to every embodiment encompassed by the appended claims.
ACK Acknowledge
BSC Base Station Controller
BSSAP Base Station Subsystem Application Part
eNodeB E-UTRAN NodeB
EPS Evolved Packet System
E-UTRAN Evolved-UTRAN
GERAN GSM/EDGE Radio Access Network
G-MSC Gateway MSC
GSM Global System for Mobile Communication
HSS Home Subscriber Server
HLR Home Location Register
IAM Initial Address Message
IMSI International Mobile Subscriber Identity
ID-HO Inter-Domain Handover
LTE Long Term Evolution
MAP Mobile Application Part
MSC Mobile Switching Center
MME Mobility Management Entity
PS Packet Switched
RNC Radio Network Controller
SABM Set Asynchronous Balanced Mode
SAE System Architecture Evolution
SGSN Serving GPRS Support Node
SRI Send Routing Information
TA Tracking Area
UE User Equipment
UMTS Universal Mobile Telecommunications System
UTRAN UMTS Terrestrial Radio Access Network
VLR Visitor Location Register
WCDMA Wideband Code-Division Multiple Access Referring to FIG. 1 (PRIOR ART), there is a diagram of an exemplary mobile telecommunications network 100 illustrating a reference architecture associated with CS Fallback which is related to the present discussion. The exemplary mobile telecommunications network 100 includes a SAE/LTE network 100a and a GSM network 100b (or UMTS network) which are described in detail in 3GPP TS 23.002 v.8.2.0 dated December 2007 and 3GPP TS 23.401 v.8.0.0 dated December 2007 (the contents of these documents are incorporated by reference herein). As such, those skilled in the art are familiar with the architecture and functionality of this exemplary mobile packet telecommunications network 100. Thus, for clarity only components such as the UE, MME, SGSN and MSC server and interfaces such as the SGs which are relevant to the present discussion are discussed in detail herein while the other well known components or entities like the E-UTRAN, UTRAN, GERAN and the interfaces S1-MME, LTE-Uu, Um, Gb, Uu, S3, IuPS, A, and IuCS are not discussed within this document. The SGs is based on the Gs interface procedures and is the reference point located between the MME and the MSC server. The SGs reference point is used for mobility management and paging procedures between the EPS and CS domains which are discussed in detail below with respect to FIGS. 2-5 (PRIOR ART). Referring to FIG. 2, there is a diagram used to illustrate one example of how the SAE/LTE network 100a and the GSM network 100b may provide overlapping coverage in one location. In this example, UE1 is attached to the SAE/LTE network 100a in LTE cell e3 which belongs to Tracking Area 1, TA1, and is controlled by eNodeB1a which is connected to MME1. The GSM network 100b also provides GSM coverage for the UE1 in the same location (as shown by the dashed lines 200a and 200b). In this case, the GSM coverage is provided by GSM cell c3 which belongs to Location Area 1, LA1, and is controlled by the BSC1a which is connected to MSC1/VLR1 and SGSN1. In this particular example, there is almost a one-to-one relationship between the GSM network's LAs and the SAE/LTE network's TAs (e.g. LA1 and TA1 provide coverage in the same area). Alternatively, the SAE/LTE network 100a and a UMTS network may also provide overlapping coverage in one geographical location. In this alternative case, the GSM network's BSCs would be replaced by a UMTS network's RNCs. Referring to FIG. 3 (PRIOR ART), there is a signal flow diagram that shows an example of how UE1 would perform a SAE/LTE Attach to become attached for the PS domain and a CS Attach to become attached for the CS domain based on the situation shown in FIG. 2. The steps are as follows:

1. UE1 is located in LTE cell e3 and performs a SAE attach (see FIG. 2).
2. UE1 sends an attach message with a CS Fallback indicator to MME-1.
3. MME-1 initiates the SAE attach per 3GPP TS 23.401 which involves UE1, eNodeB1a, MME1 and HSS.
4. MME1 decides that the UE1 is to be CS attached in MSC1/VLR1.
5. MME1 sends a location update message to MSC1/VLR1.
6. MSC1/VLR1 and HSS perform a normal location update.
7. MSC1/VLR1 sends a location update accept message to MME1.
8. MME1 sends an attach accept message to UE1.

Figure 4:
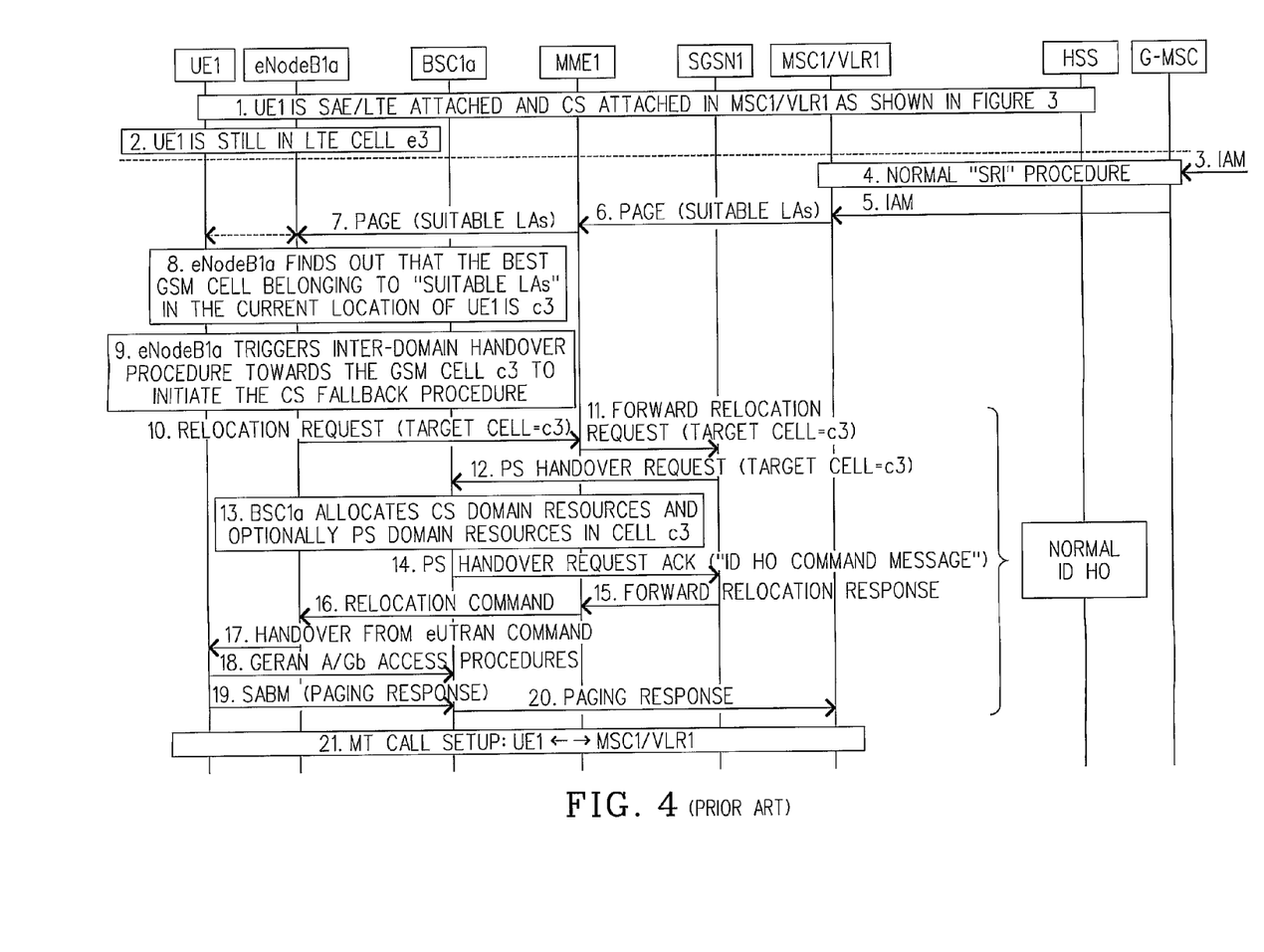
FIG. 4 (PRIOR ART) is a signal flow diagram that shows an example of how the CS Fallback can be performed for a Mobile Terminated call in the case where there is no LA/TA mismatch problem.

Referring to FIG. 4 (PRIOR ART), there is a signal flow diagram that shows an example of how the CS Fallback can be performed for a MT call in the case where there is no LA/TA mismatch problem. The steps are as follows:

1. UE1 is SAE/LTE attached and CS attached in MSC1/VLR1 as shown in FIG. 3.
2. UE1 is still located in LTE cell e3.
3. G-MSC receives an IAM (MT call request).
4. G-MSC initiates a normal SRI procedure with MSC1/VLR1.

5. G-MSC sends the IAM to MSC1/VLR1.
6. MSC1/VLR1 sends a page message (with suitable LAs) to MME1.
7. MME1 sends the page message (with suitable LAs) to eNodeB1a which then interfaces with UE1.
8. eNodeB1a finds out that the best GSM cell belonging to the suitable LAs (associated with the page message) based on the current location of UE1 is c3. For instance, the eNodeB1a could make this determination based on measurement reports received from UE1 i.e. indicating how well UE1 "hears" the GSM cells. Another option could be to configure the eNodeB1a such that it knows an E-UTRAN/LTE cell is totally covered by a specific GSM/WCDMA cell.
9. eNodeB1a triggers an Inter-Domain Handover procedure towards the GSM cell c3 to initiate the CS Fallback procedure.
10. eNodeB1a sends a relocation request message (with target cell=c3) to MME1.
11. MME1 sends the forward relocation request message (with target cell=c3) to SGSN1.
12. SGSN1 sends a PS handover request message (with target cell=c3) to BSC1a.
13. BSC1a allocates PS domain resources and CS domain resources in target cell c3.
14. BSC1a sends a PS handover request acknowledge message ("ID HO command message") to SGSN1.
15. SGSN1 sends a forward relocation response message to MME1.
16. MME1 sends a relocation command to eNodeB1a.
17. eNodeB1a sends a handover from eUTRAN command to UE1.
18. UE1 initiates GERAN A/Gb Access Procedures with BSC1a using the allocated PS domain resources.
19. UE1 sends a SABM (paging response message) to BSC1a using the allocated CS domain resources.
20. BSC1a forwards the paging response message to MSC1/VLR1. Note: steps 10-20 are a normal ID HO.
21. MSC1/VLR1 initiates the MT call setup with UE1.

Figure 5:
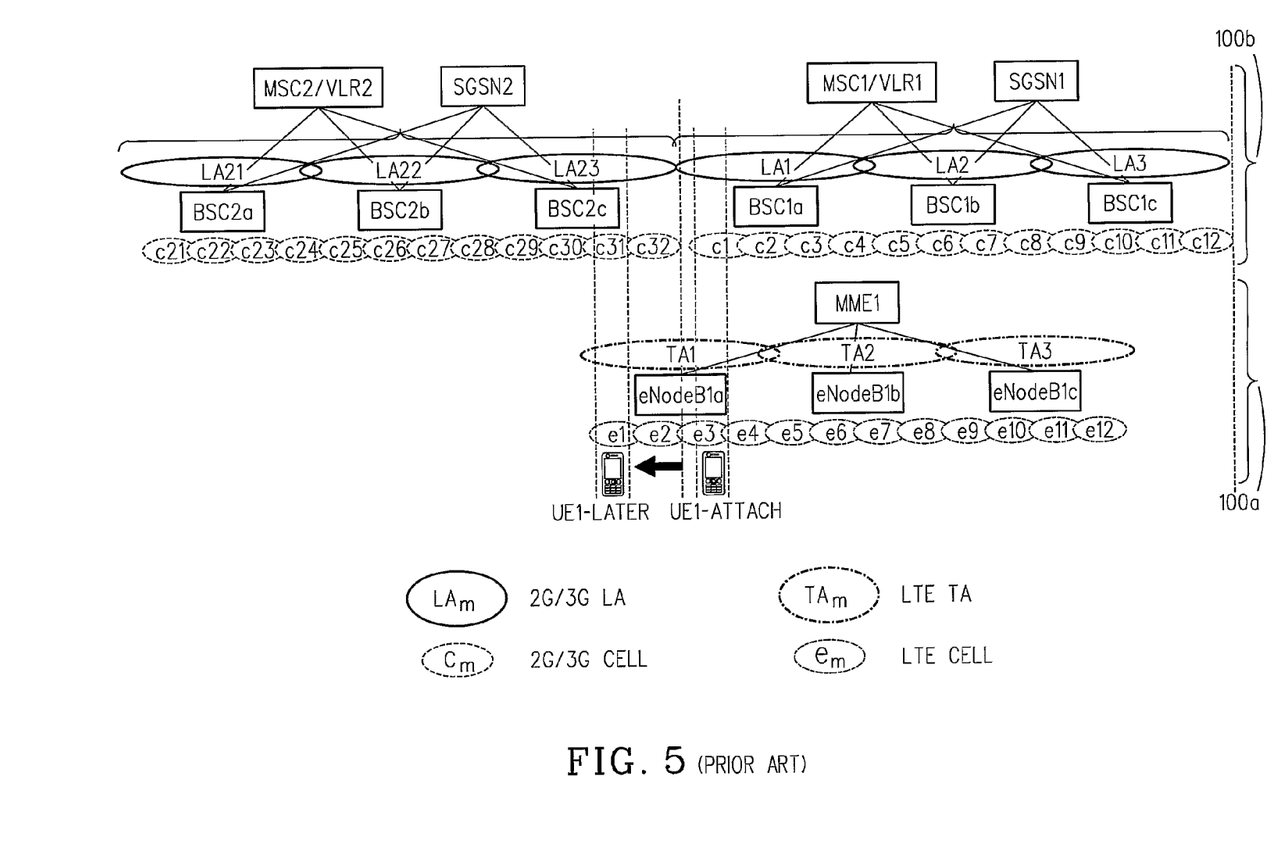
FIG. 5 (PRIOR ART) is a diagram which is used to describe the LA/TA mismatch problem related to CS Fallback for Mobile Terminated calls which is solved by the present invention.

FIG. 5 (PRIOR ART) is a diagram used to help describe the LA/TA mismatch problem related to CS Fallback for Mobile Terminated calls. In this case, the GSM LAs and the SAE/LTE TAs are not fully coordinated (i.e. there is no 1-to-1 relationship between the cells). Two different locations for different points in time are shown for UE1. The "UE1-attach" indicates the location at the time when the UE1 performed the SAE/LTE Attach in LTE cell e3 and became also CS Attached to MSC1/VLR1 based on the sequence and principles shown in FIG. 3. The "UE1-later" shows the location of the UE1 later when it has moved (while in LTE Idle mode) to the LTE cell e1. As LTE cells e3, e2 and e1 belong to the same TA1, after and during moving to LTE cell e1, UE1 does not perform any mobility related signaling towards the SAE/LTE network 100a and the UE1 therefore remains CS Attached in MSC1/VLR1 (i.e. it does not become CS attached in MSC2/VLR2). The LA/TA mismatch becomes a problem in this particular case. If there is a MT call arriving at MSC1/VLR1 (as shown in step 5 of FIG. 4) for UE1 at the "UE-later" location, then there is no GSM cell in the current location of UE1 that is connected to MSC1/VLR1. Instead, GSM Cell c31 is connected to MSC2/VLR2. This means that the CS Fallback procedure in FIG. 4 is not sufficient in this case. In particular, if the CS Fallback procedure where to be performed as shown in FIG. 4, then UE1 would experience ID HO to GSM Cell c31 and the paging response message would be sent to BSC2 and MSC2/VLR2. But since MSC1/VLR1 holds the MT call request, there is no way for the MT call to succeed in this situation because MSC2/VLR2 will receive the paging response message and has no way of knowing how to relay the paging response message to MSC1/VLR1 (i.e. there is a mismatch between the MSC receiving the MT call request and the MSC receiving the paging response message). Thus, there has been a need to address this problem and other problems which are associated with the existing CS Fallback procedures. This particular need and other needs have been addressed by the present invention.

SUMMARY

In one aspect, the present invention provides a node (e.g. enhanced eNodeB) that addresses the LA/TA mismatch problem which could occur during a CS Fallback for a Mobile Terminated call. In one embodiment, the node (enhanced eNodeB) includes a processor and a memory that stores processor-executable instructions where the processor interfaces with the memory and executes the processor-executable instructions to: (a) receive a paging message from a mobility management entity, MME, where the paging message identifies suitable location areas, the paging message is sent because a first mobile switching center, MSC1, received a MT call request for the UE; (b) determine that there are no 2G/3G cells belonging to the indicated suitable location areas based on the current location of the UE; (c) identify a target 2G/3G cell in a location area associated with the current location of the UE but not part of the 2G/3G cells belonging to the indicated suitable location areas (i.e. a cell controlled by MSC2/BSC2 is identified); and (d) enable a signaling connection to be established between the UE and the first MSC1 via a second mobile switching center, MSC2, where the second MSC2 interfaces with a base station controller, BSC2, or a radio network controller, RNC2, that manages the target 2G/3G cell, where the signaling connection allows the MT call to be established with the UE. In this way, the node effectively prevents the MT call to the UE from being lost.

In another aspect, the present invention provides a method that addresses the LA/TA mismatch problem which could occur during a CS Fallback for a Mobile Terminated call. In one embodiment, the method includes the steps of: (a) receiving a paging message from a mobility management entity, MME, where the paging message identifies suitable location areas, the paging message is sent because a first mobile switching center, MSC1, received a MT call request for the UE; (b) determining that there are no 2G/3G cells belonging to the indicated suitable location areas based on a current location of the UE; (c) identifying a target 2G/3G cell in a location area associated with the current location of the UE but not part of the 2G/3G cells belonging to the indicated suitable location areas (i.e. a cell controlled by MSC2/BSC2 is identified); and (d) enabling a signaling connection to be established between the UE and the first MSC1 via a second mobile switching center, MSC2, where the second MSC2 interfaces with a base station controller, BSC2, or a radio network controller, RNC2, that manages the target 2G/3G cell, where the signaling connection allows the MT call to be established with the UE. In this way, the method effectively prevents the MT call to the UE from being lost.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

The enhanced node (eNodeB1) and method of the present invention solve the aforementioned LA/TA mismatch problem that could occur during a CS Fallback for a MT call. The enhanced node implements a method that prevents a MT call to a UE1 from being lost by receiving a paging message from a MME1 after a first MSC1 receives a MT call request (TAM) for UE1. The paging message identifies the suitable LAs associated with the first MSC1 which is where UE1 is CS attached but has since re-located to a coverage area managed by a second MSC2 (e.g. UE1 is in location "UE1-later"). Upon receiving the paging message, the enhanced node determines that there are no 2G/3G cells which belong to the paging message's suitable LAs based on the current location of UE1. Then, the enhanced node identifies a target 2G/3G cell in a LA that is associated with the current location of UE1 but the target 2G/3G cell is not part of the 2G/3G cells belonging to the paging message's suitable location areas. Thereafter, the enhanced node enables a signaling connection to be established between UE1 and the first MSC1 via the second MSC2 where the signaling connection allows the MT call to be established with UE1. Three exemplary embodiments on how this solution can be implemented are discussed in detail below with respect to FIGS. 6-8.

Figure 6:
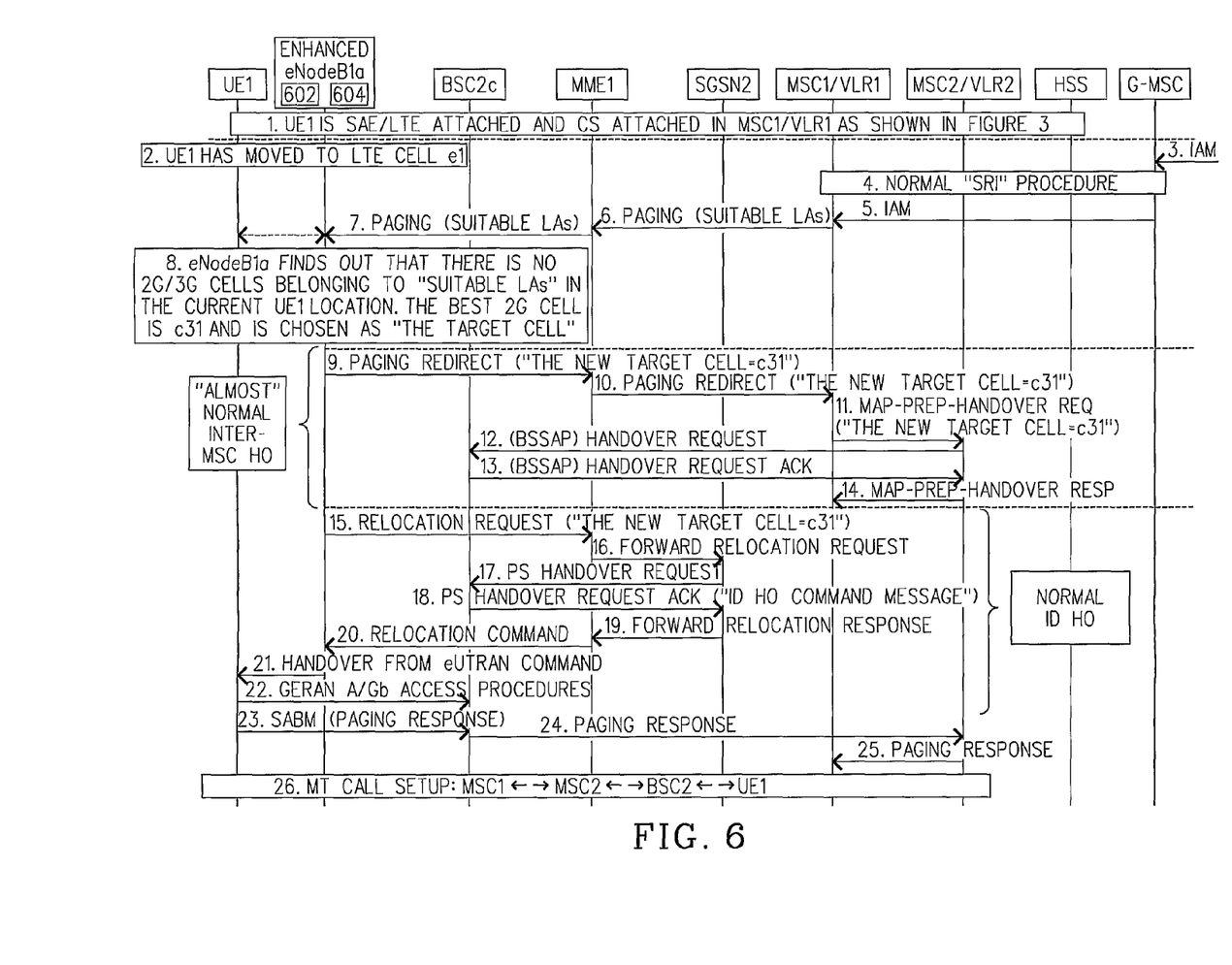
FIG. 6 is a signal flow diagram which is used to describe how an enhanced node (enhanced eNodeB) and a method solve the LA/TA mismatch problem related to CS Fallback for MT calls in accordance with a first embodiment of the present invention.

Referring to FIG. 6, there is a signal flow diagram which is used to describe how the enhanced node (enhanced eNodeB1) solves the LA/TA mismatch problem related to CS Fallback for MT calls in accordance with a first embodiment of the present invention. The steps are as follows:

1. UE1 is SAE/LTE attached and CS attached in MSC1/VLR1 as shown in FIG. 3.
2. UE1 has moved from LTE cell e3 to LTE cell e1 (see FIG. 5).
3. G-MSC receives an JAM (MT call request).
4. G-MSC initiates a normal SRI procedure with MSC1/VLR1.
5. G-MSC sends the JAM to MSC1/VLR1.
6. MSC1/VLR1 sends a page message (with suitable LAs) to MME1.
7. MME1 sends the page message (with suitable LAs) to the enhanced eNodeB1a which then interfaces with UE1.
8. Enhanced eNodeB1a finds out that there are no 2G/3G cells belonging to the suitable LAs (associated with the page message) based on the current location of UE1. The enhanced eNodeB1a determines that the best GSM cell, based on the current location of UE1, is c31. The best 2G/3G cell is referred to herein as the target cell c31. For instance, the enhanced eNodeB1a could make this determination based on measurement reports received from UE1 i.e. indicating how well UE1 "hears" the GSM cells. Another option could be to configure the enhanced eNodeB1a such that it knows an E-UTRAN/LTE cell is totally covered by a specific GSM/WCDMA cell.
9. Enhanced eNodeB1a sends a paging redirect message (identifying the new target cell=c31) to MME1.
10. MME1 forwards the paging redirect message (identifying the new target cell=c31) to MSC1/VLR1.
11. MSC1/VLR1 sends a MAP-Prep-Handover request (identifying the new target cell=c31) to MSC2/VLR2. MSC2/VLR2 is associated with BSC2c (or RNC2c) which manages the target cell c31.
12. MSC2/VLR2 sends a BSSAP Handover Request to BSC2c (or RNC2c).
13. BSC2c (or RNC2c) sends a BSSAP Handover Request Acknowledgment to MSC2/VLR2.
14. MSC2/VLR2 sends a MAP-Prep-Handover response to MSC1/VLR1. Note: steps 9-14 are "almost" a normal Inter-MSC Handover.
15. Enhanced eNodeB1a sends a relocation request message (with target cell=c31) to MME1. Note: the enhanced eNodeB1a can trigger in parallel both steps 9 and 15 (see discussion below).
16. MME1 forwards the relocation request message (with target cell=c31) to SGSN2.
17. SGSN2 sends a PS handover request message to BSC2c.
18. BSC2c allocates both PS domain and CS domain resources and sends a PS handover request acknowledge message ("ID HO Command message") to SGSN2.
19. SGSN2 sends a forward relocation response message to MME1.
20. MME1 sends a relocation command to enhanced eNodeB1a.
21. Enhanced eNodeB1a sends a handover from eUTRAN command to UE1.
22. UE1 initiates GERAN A/Gb Access Procedures with BSC2c using allocated PS domain resources.
23. UE1 sends a SABM (paging response message) to BSC2c using allocated CS domain resources. Note: steps 15-23 are a normal Inter-Domain Handover.

24. BSC2c forwards the paging response message to MSC2/VLR2.
25. MSC2/VLR2 forwards the paging response message to MSC1/VLR1.
26. MT call setup: MSC1 ↔ MSC2 ↔ BSC2c ↔ UE1.
Note 1: This signal flow diagram shows how this embodiment of present invention would function based on the scenario shown in FIG. 5. It should be appreciated that this mobile telecommunications network is exemplary and that the present invention should not be construed as needing to be used in any specific type or any specific architecture of a mobile telecommunications network.
Note 2: The enhanced eNodeB1 has a processor 602 that accesses instructions from a memory 604 and processes those instructions to perform the aforementioned steps 7-9, 15, 20 and 21.

In this embodiment, the "paging request redirect" solution can also be described as follows when the enhanced eNodeB1a receives the paging message from the MME1 it finds out that there are no 2G/3G cells belonging to the "Suitable LAs" based on the current location (LTE cell e1) of UE1 (steps 7 and 8). However, the enhanced eNodeB1a identifies a good 2G/3G cell (2G/3G cell c31) which can be the target cell for the CS Fallback, but that target cell is controlled by another MSC/MSC-Pool (i.e. it is not part of the Suitable LAs indicated by the page message) (step 8). At this point, two different sequences can be triggered by the enhanced eNodeB1a in parallel.
Sequence 1: The enhanced eNodeB1a sends a "paging request redirect" message back to the MME1 which forwards the paging request redirect message to MSC1/VLR1 which sent the page message (steps 6 and 9-10). The identity of the target cell is included in the paging request redirect message. When MSC1/VLR1 receives the paging request redirect message, it triggers an Inter-MSC Handover towards that target cell and includes the IMSI of the UE1 and an optional flag indicating "HO for Paging Response" (steps 11-14). This Inter-MSC Handover results in a signalling connection being established between MSC1 (which received the MT call request) and BSC2c/RNC2c via the MSC2 (which manages BSC2c/RNC2c associated with the target cell and which will receive the paging response message upon the UE1s arrival in the target cell) (steps 15-26). As part of this Inter-MSC Handover procedure, the BSC2c/RNC2c which controls the target cell could receive a Handover Request message indicating the optional "HO for Paging Response" and would store the IMSI associated with the signalling connection to MSC2 (which extends back to MSC1) (step 12). This signaling connection will be used for sending the paging response message and the subsequent MT call establishment signalling that will be performed between UE1 and MSC1 after UE1 completes the normal ID HO to the target cell (steps 15-26). The BSC2c/RNC2c may also use the optional "HO for Paging Response" flag to know that no CS resources need to be returned in the signalling back to MSC2 which triggered the Handover request (step 13). The purpose of this sequence is to create the signalling connection between the BSC2c/RNC2c controlling the target cell and the MSC1 holding the MT Call request (i.e. with MSC2 providing a signaling relay function in this example).
Sequence 2 (performed in parallel with sequence 1 above): The enhanced eNodeB1a triggers a normal Inter-Domain HO towards the target cell (IMSI is also included in this signalling by the MME1) (step 15). This results in an ID HO COMMAND message being sent to the UE1 (step 21). Once UE1 accesses the target cell and sends the paging response message using the allocated CS domain resources, BSC2c/RNC2c knows that this paging response message needs to be forwarded on the signalling connection (which goes all the way back to MSC1) created during the above described Inter-MSC Handover procedure (e.g. based on the same IMSI received during both sequences) (steps 9-25). This means that the paging response message is returned to MSC1 which holds the MT call and at that point normal MT call establishment signalling may continue between UE1 and MSC1 (where MSC2 only serves to relay these messages) (steps 25-26).

Figure 7:
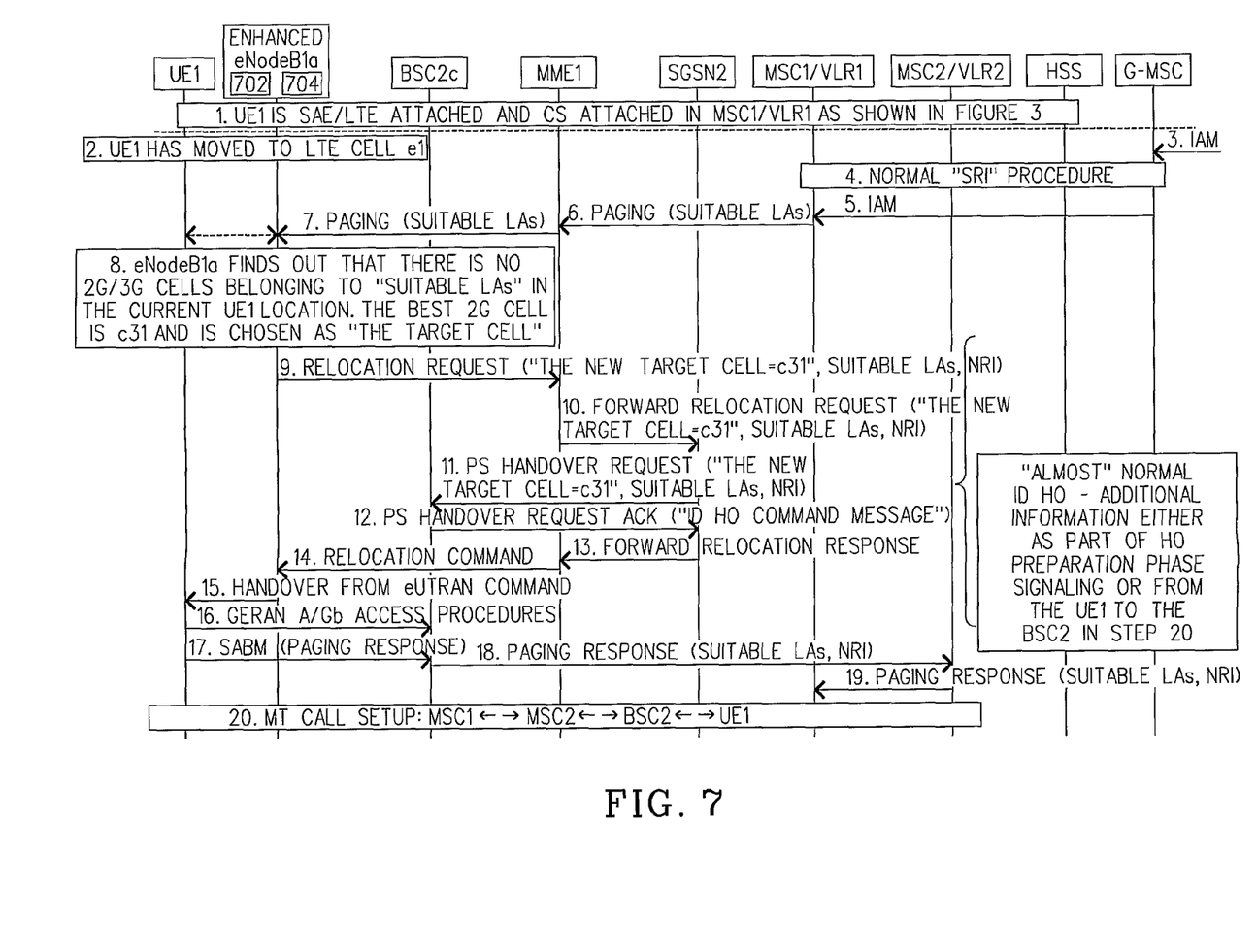
FIG. 7 is a signal flow diagram which is used to describe how an enhanced node (enhanced eNodeB) and a method solve the LA/TA mismatch problem related to CS Fallback for MT calls in accordance with a second embodiment of the present invention.

Referring to FIG. 7, there is a signal flow diagram which is used to describe how the enhanced node (enhanced eNodeB1) solves the LA/TA mismatch problem related to CS Fallback for MT calls in accordance with a second embodiment of the present invention. The steps are as follows:
1. UE1 is SAE/LTE attached and CS attached in MSC1/VLR1 as shown in FIG. 3.
2. UE1 has moved from LTE cell e3 to LTE cell e1 (see FIG. 5).
3. G-MSC receives an IAM (MT call request).
4. G-MSC initiates a normal SRI procedure with MSC1/VLR1.
5. G-MSC sends the IAM to MSC1/VLR1.
6. MSC1/VLR1 sends a page message (with suitable LAs) to MME1.
7. MME1 sends the page message (with suitable LAs) to the enhanced eNodeB1a which then interfaces with UE1.
8. Enhanced eNodeB1a finds out that there are no 2G/3G cells belonging to the suitable LAs (associated with the page message) based on the current location of UE1. The enhanced eNodeB1a determines that the best GSM cell based on the current location of UE1 is c31. The best 2G/3G cell is referred to herein as the target cell c31. For instance, the enhanced eNodeB1a could make this determination based on measurement reports received from UE1 i.e. indicating how well UE1 "hears" the GSM cells. Another option could be to configure the enhanced eNodeB1a such that it knows an E-UTRAN/LTE cell is totally covered by a specific GSM/WCDMA cell.
9. Enhanced eNodeB1a sends a relocation request message (identifying target cell=c31, suitable LAs, NRI) to MME1.
10. MME1 sends the forward relocation request message (identifying target cell=c31, suitable LAs, NRI) to SGSN2.
11. SGSN2 sends a PS handover request message (identifying target cell=c31, suitable LAs, NRI) to BSC2c.
12. BSC2c allocates both PS domain and CS domain resources and sends a PS handover request acknowledge message ("ID HO Command message") to SGSN2.
13. SGSN2 sends a forward relocation response message to MME1.
14. MME1 sends a relocation command to enhanced eNodeB1a.
15. Enhanced eNodeB1a sends a handover from eUTRAN command to UE1.
16. UE1 initiates GERAN A/Gb Access Procedures with BSC2c using the allocated PS domain resources.
17. UE1 sends a SABM (paging response message) to BSC2c using the allocated CS domain resources.
18. BSC2c sends a paging response message (identifying suitable LAs, NRI) to MSC2/VLR2. Note: these suitable LAs and NM are the same as the ones in the relocation request message at step 9.
19. MSC2/VLR2 forwards the paging response message (identifying suitable LAs, NRI) to MSC1/VLR1. A detailed discussion is provided below about this particular step and the establishment of the signaling connection between MSC2/VLR2 and MSC1/VLR1.
20. MT call setup: MSC1 ↔ MSC2 ↔ BSC2c ↔ UE1.
Note 1: This signal flow diagram shows how this embodiment of present invention would function based on the scenario shown in FIG. 5. It should be appreciated that this mobile telecommunications network is exemplary and that the present invention should not be construed as needing to be used in any specific type or any specific architecture of a mobile telecommunications network.

Note 2: The enhanced eNodeB1 has a processor 702 that accesses instructions from a memory 704 and processes those instructions to perform the aforementioned steps 7-9 and 15.

In this embodiment, the "paging response redirect" solution can also be described as follows when the enhanced eNodeB1a receives the paging message from the MME1 it finds out that there are no 2G/3G cells belonging to the "Suitable LAs" based on the current location (LTE cell e1) of UE1 (steps 7 and 8). The enhanced eNodeB1a then triggers the ID HO towards the best target 2G/3G cell available (step 9). The UE1 is then commanded to perform ID HO to that target cell and upon arrival in the target cell it sends the paging response message to BSC2c/RNC2c which controls that target cell (steps 15 and 17). However, when the BSC2/MSC2 receives the paging response message there is no signalling connection available from BSC2c/RNC2c towards MSC1 (which received the MT call request) (step 18). Thus, the signalling connection needs to be established from the BSC2c/RNC2c towards the MSC/MSC-Pool holding the MT call (in this example MSC1) (step 19 and 20).

The identifiers used for establishing this signalling connection from BSC2c/MSC2c to MSC1 are for example (i) target cell (only steps 9-11), (ii) the "Suitable LAs" that will uniquely identify the correct MSC or the correct MSC-Pool which covers the target cell in which the UE1 is currently located, and (iii) NRI which will identify the correct MSC-Pool member (in the above example MSC1) in the case MSC-pool is deployed (steps 9-11 and 18-19). MSC2 would then establish a signaling link to some MSC-X within the indicated suitable LAs (step 19). MSC-X would then look at the NRI it receives from MSC2 and if it determines it was not MSC1 then MSC-X would then establish another signaling link to MSC1 (and eventually a signaling path can be established between MSC1 and MSC2 and by-pass MSC-X altogether). In the current example shown in FIG. 7, the simple case is assumed whereby MSC-X=MSC1. As such, if BSC2c/RNC2c indicates both the "Suitable LAs" and the NRI when the signalling connection is established towards MSC2, then this will allow for establishing the required signalling connection towards the correct MSC/MSC-Pool (in this example MSC1) using these identifiers (steps 18-20). Once established, BSC2c/RNC2c uses this signalling connection to send the received paging response message to MSC1 (via MSC2) and then for the subsequent MT call establishment signalling between UE1 and MSC1 (steps 18-20). At some point during the MT call establishment with UE1, the MSC1 and MSC2 can signal the establishment of a user plane connection appropriate for terminating the MT call with UE1 (step 20).

Figure 8:
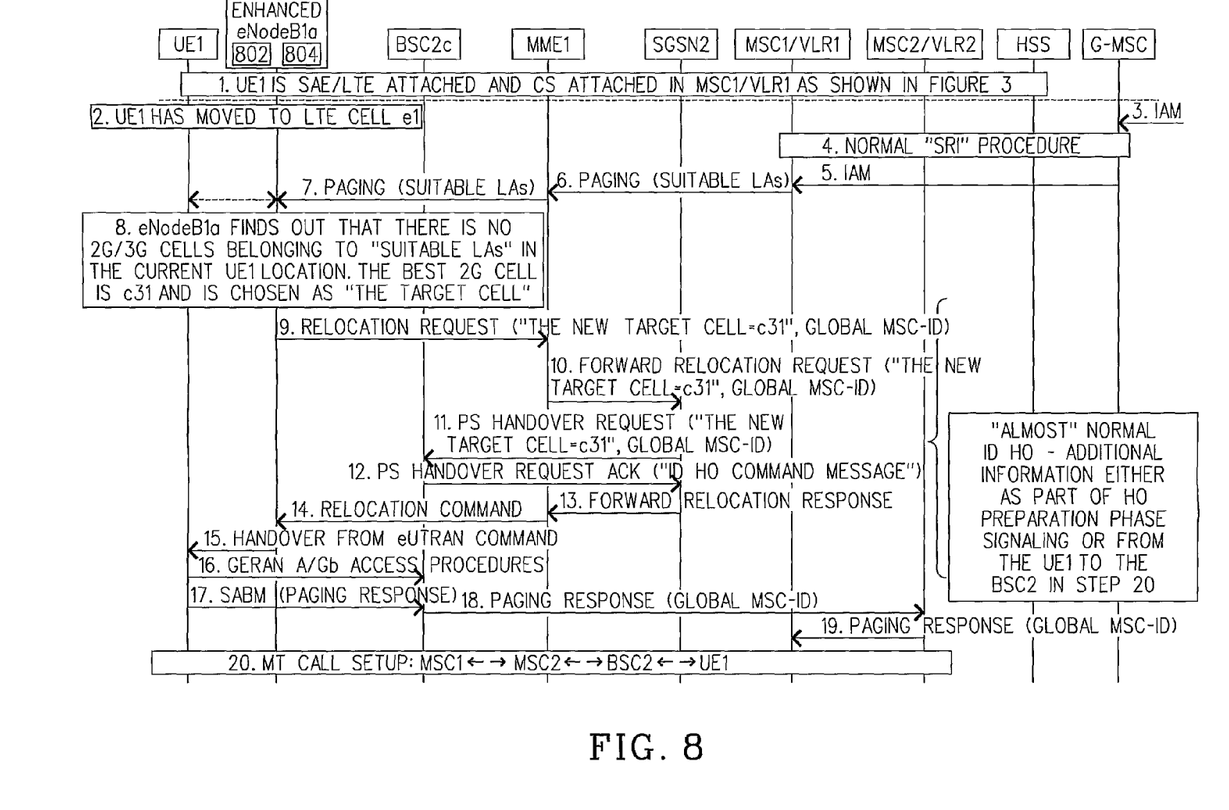
FIG. 8 is a signal flow diagram which is used to describe how an enhanced node (enhanced eNodeB) and a method solve the LA/TA mismatch problem related to CS Fallback for MT calls in accordance with a third embodiment of the present invention.

Referring to FIG. 8, there is a signal flow diagram which is used to describe how the enhanced node (enhanced eNodeB1) solves the LA/TA mismatch problem related to CS Fallback for MT calls in accordance with a third embodiment of the present invention. The steps are as follows:

1. UE1 is SAE/LTE attached and CS attached in MSC1/VLR1 as shown in FIG. 3.
2. UE1 has moved from LTE cell e3 to LTE cell e1 (see FIG. 5).
3. G-MSC receives an IAM (MT call request).
4. G-MSC initiates a normal SRI procedure with MSC1/VLR1.
5. G-MSC sends the IAM to MSC1/VLR1.
6. MSC1/VLR1 sends a page message (with suitable LAs) to MME1.
7. MME1 sends the page message (with suitable LAs) to the enhanced eNodeB1a which then interfaces with UE1.
8. Enhanced eNodeB1a finds out that there are no 2G/3G cells belonging to the suitable LAs (associated with the page message) based on the current location of UE1. The enhanced eNodeB1a determines that the best GSM cell based on the current location of UE1 is c31. The best 2G/3G cell is referred to herein as the target cell c31. For instance, the enhanced eNodeB1a could make this determination based on measurement reports received from UE1 i.e. indicating how well UE1 "hears" the GSM cells. Another option could be to configure the enhanced eNodeB1a such that it knows an E-UTRAN/LTE cell is totally covered by a specific GSM/WCDMA cell.
9. Enhanced eNodeB1a sends a relocation request message (identifying target cell=c31, Global MSC-ID) to MME1.
10. MME1 forwards the relocation request message (identifying target cell=c31, Global MSC-ID) to SGSN2.
11. SGSN2 sends a PS handover request message (identifying target cell=c31, Global MSC-ID) to BSC2c.
12. BSC2c allocates both PS domain and CS domain resources and sends a PS handover request acknowledge message ("ID HO Command message") to SGSN2.
13. SGSN2 sends a forward relocation response message to MME1.
14. MME1 sends a relocation command to enhanced eNodeB1a.
15. Enhanced eNodeB1a sends a handover from eUTRAN command to UE1.
16. UE1 initiates GERAN A/Gb Access Procedures with BSC2c using the allocates PS domain resources.
17. UE1 sends a SABM (paging response message) to BSC2c using the allocated CS domain resources.
18. BSC2c sends a paging response message (identifying Global MSC-ID) to MSC2/VLR2.
19. MSC2/VLR2 forwards the paging response message (identifying Global MSC-ID) to MSC1/VLR1. A detailed discussion is provided below about this particular step and the establishment of the signaling connection between MSC2/VLR2 and MSC1/VLR1.
20. MT call setup: MSC1 ↔ MSC2 ↔ BSC2c ↔ UE1.

Note 1: This signal flow diagram shows how this embodiment of present invention would function based on the scenario shown in FIG. 5. It should be appreciated that this mobile telecommunications network is exemplary and that the present invention should not be construed as needing to be used in any specific type or any specific architecture of a mobile telecommunications network.

Note 2: The enhanced eNodeB1 has a processor 802 that accesses instructions from a memory 804 and processes those instructions to perform the aforementioned steps 7-9 and 15.

In this embodiment, the alternative "paging response redirect" solution can also be described as follows when the enhanced eNodeB1a receives the paging message from the MME1 it finds out that there are no 2G/3G cells belonging to the "Suitable LAs" based on the current location (LTE cell e1) of UE1 (steps 7 and 8). The enhanced eNodeB1a then triggers the ID HO towards the best target 2G/3G cell available (step 9). The UE1 is then commanded to perform ID HO to that target cell and upon arrival in the target cell it sends the paging response message to BSC2c/RNC2c which controls that target cell (steps 15 and 17). However, when the BSC2c/MSC2c receives the paging response message there is no signalling connection available from BSC2c/RNC2c towards MSC1 (which received the MT call request) (step 18). Thus, the signalling connection needs to be established from the BSC2c/RNC2c towards the MSC/MSC-Pool holding the MT call (in this example MSC1) (step 19 and 20) after completion of the PS handover procedure using the allocated PS domain resources.

The identifiers used for establishing this signaling connection from BSC2c/MSC2 to MSC1 are for example (i) target cell (only steps 9-11) and (ii) a "Global MSC-ID" which specifically identifies the MSC1 (in this example) as the MSC that received the MT call request (see steps 9-11 and 18-19). In this case, the BSC2c/RNC2c would be passed the "Global MSC-ID" in a forward transparent container (for example) during the ID HO preparation phase (step 11). Then, the BSC2c/RNC2c could pass this "Global MSC-ID" along with the paging response message it sends to MSC2 which will then use this information to establish the required signalling connection to MSC1 (steps 18-19). Once established, BSC2c/RNC2c uses this signalling connection to send the received paging response message to MSC1 (via MSC2) and then for the subsequent MT call establishment signalling between UE1 and MSC1 (steps 18-20). At some point during the MT call establishment with UE1, the MSC1 and MSC2 can signal the establishment of a user plane connection appropriate for terminating the MT call with UE1 (step 20).

Although three embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as has been set forth and defined by the following claims.

What is claimed is:

1. A node for preventing a mobile terminated, MT, call to a user equipment, UE, from being lost, said node comprising:
a processor; and
a memory that stores processor-executable instructions where the processor interfaces with the memory and executes the processor-executable instructions to:
receive a paging message from a mobility management entity, MME, where the paging message identifies suitable location areas, the paging message is sent because a first mobile switching center, MSC1, received a MT call request for the UE;
determine that there are no 2G/3G cells belonging to the suitable location areas based on a current location of the UE;
identify a target 2G/3G cell in a location area associated with the current location of the UE but not part of the 2G/3G cells belonging to the suitable location areas; and
enable a signaling connection to be established between the UE and the first MSC1 via a second mobile switching center, MSC2, where the second MSC2 interfaces with a base station controller, BSC2, or a radio network controller, RNC2, that manages the target 2G/3G cell, where the signaling connection allows the MT call to be established with the UE.

2. The node of claim 1, wherein the processor further executes the processor-executable instructions to perform the enabling operation by:
sending a paging redirect message which identifies the target 2G/3G cell to the MME, where the MME forwards the paging redirect message to the first MSC1 which triggers an inter-MSC handover towards the target 2G/3G cell which results in the signaling connection being established between the first MSC1 and the BSC2/RNC2 via the second MSC2;
sending a relocation request message to the MME, where the MME triggers an inter-domain handover towards the target 2G/3G cell managed by the BSC2/RNC2; and
sending a handoff command to the UE, where the UE then sends a paging response message to the BSC2/RNC2 which forwards the paging response message on the signaling connection to the first MSC1 via the second MSC2 which enables the MT call to be established with the UE.

3. The node of claim 1, wherein the processor further executes the processor-executable instructions to perform the enabling operation by:
sending a relocation request message to the MME, where the relocation request message identifies the 2G/3G target cell and the suitable location areas associated with the 2G/3G target cell, where the MME then triggers an inter-domain handover towards the target 2G/3G cell managed by the BSC2/RNC2;
sending a handoff command to the user equipment, where the UE then sends a paging response message to the BSC2/RNC2 which at this point the signaling connection is established between the UE and the first MSC1 via the second MSC2 by having the BSC2/RNC2 forward the paging response message along with the suitable location areas associated with the 2G/3G target cell to the second MSC2, where the second MSC2 then establishes a signalling connection to some MSCX associated with the suitable location areas associated with the 2G/3G target cell where if the MSCX is the first MSC1 then the signaling connection established between the UE and the first MSC1 via the second MSC2 is used to terminate the MT call with the UE.

4. The node of claim 3, wherein if the MSCX is not the first MSC1 then the MSCX would establish another signaling connection to the first MSC1 such that the signal connection is subsequently established between the first MSC1 and the second MSC2 which enables the MT call to be established with the UE.

5. The node of claim 3, where the suitable location areas included in the relocation request message identifies the first MSC1 or a MSC-pool associated with the first MSC1, and where the relocation request message also includes a network resource identifier, NRI, which uniquely identifies the MSC1 in case a MSC-pool is associated with the suitable location areas, where the paging response messages sent to the second MSC2 would also include the suitable location areas and the NRI.

6. The node of claim 1, wherein the processor further executes the processor-executable instructions to perform the enabling operation by:
sending a relocation request message to the MME, where the relocation request message includes an identifier indicating the 2G/3G target cell and an identifier indicating the first MSC1, where the MME then triggers an inter-domain handover towards the target 2G/3G cell managed by the BSC2/RNC2;
sending a handoff command to the user equipment, where the user equipment then sends a paging response message to the second MSC2 which at this point the signaling connection is established between the UE and the first MSC1 via the BSC2/RNC2 and the second MSC2 by having the BSC2/RNC2 forward the paging response message along with the identifier indicating the first MSC1 to the second MSC2, where the second MSC2 then establishes a signalling connection to the first MSC1 where the signaling connection established between the UE and the first MSC1 via the second MSC2 is used to terminate the MT call with the UE.

7. The node of claim 1, wherein the node is an eNodeB.

8. A method implemented by a node for preventing a mobile terminated, MT, call to a user equipment, UE, from being lost, said method comprising the steps of:
receiving a paging message from a mobility management entity, MME, where the paging message identifies suitable location areas, the paging message is sent because a first mobile switching center, MSC1, received a MT call request for the UE;
determining that there are no 2G/3G cells belonging to the suitable location areas based on a current location of the UE;
identifying a target 2G/3G cell in a location area associated with the current location of the UE but not part of the 2G/3G cells belonging to the suitable location areas; and
enabling a signaling connection to be established between the UE and the first MSC1 via a second mobile switching center, MSC2, where the second MSC2 interfaces with a base station controller, BSC2, or a radio network controller, RNC2, that manages the target 2G/3G cell, where the signaling connection allows the MT call to be established with the UE.

9. The method of claim 8, wherein the enabling step further includes the steps of:
sending a paging redirect message which identifies the target 2G/3G cell to the MME, where the MME forwards the paging redirect message to the first MSC1 which triggers an inter-MSC handover towards the target 2G/3G cell which results in the signaling connection being established between the first MSC1 and the BSC2/RNC2 via the second MSC2;
sending a relocation request message to the MME, where the MME triggers an inter-domain handover towards the target 2G/3G cell managed by the BSC2/RNC2; and
sending a handoff command to the UE, where the UE then sends a paging response message to the BSC2/RNC2 which forwards the paging response message on the signaling connection to the first MSC1 via the second MSC2 which enables the MT call to be established with the UE.

10. The method of claim 8, wherein the enabling step further includes the steps of:
sending a relocation request message to the MME, where the relocation request message identifies the 2G/3G target cell and the suitable location areas associated with the 2G/3G target cell, where the MME then triggers an inter-domain handover towards the target 2G/3G cell managed by the BSC2/RNC2;
sending a handoff command to the user equipment, where the UE then sends a paging response message to the BSC2/RNC2 which at this point the signaling connection is established between the UE and the first MSC1 via the second MSC2 by having the BSC2/RNC2 forward the paging response message along with the suitable location areas associated with the 2G/3G target cell to the second MSC2, where the second MSC2 then establishes a signalling connection to some MSCX associated with the suitable location areas associated with the 2G/3G target cell where if the MSCX is the first MSC1 then the signaling connection established between the UE and the first MSC1 via the second MSC2 is used to terminate the MT call with the UE.

11. The method of claim 10, wherein if the MSCX is not the first MSC1 then the MSCX would establish another signaling connection to the first MSC1 such that the signal connection is subsequently established between the first MSC1 and the second MSC2 which enables the MT call to be established with the UE.

12. The method of claim 10, where the suitable location areas included in the relocation request message identifies the first MSC1 or a MSC-pool associated with the first MSC1, and where the relocation request message also includes a network resource identifier, NRI, which uniquely identifies the MSC1 in case a MSC-pool is associated with the suitable location areas, where the paging response messages sent to the second MSC2 would also include the suitable location areas and the NRI.

13. The method of claim 8, wherein the enabling step further includes the steps of:
sending a relocation request message to the MME, where the relocation request message includes an identifier indicating the 2G/3G target cell and an identifier indicating the first MSC1, where the MME then triggers an inter-domain handover towards the target 2G/3G cell managed by the BSC2/RNC2;
sending a handoff command to the user equipment, where the user equipment then sends a paging response message to the BSC2/RNC2 which at this point the signaling connection is established between the UE and the first MSC1 via the BSC2/RNC2 and the second MSC2 by having the BSC2/RNC2 forward the paging response message along with the identifier indicating the first MSC1 to the second MSC2, where the second MSC2 then establishes a signalling connection to the first MSC1 where the signaling connection established between the UE and the first MSC1 via the second MSC2 is used to terminate the MT call with the UE.

14. The method of claim 8, wherein the node is an eNodeB.

* * * * *

UNITED STATES PATENT AND TRADEMARK OFFICE
CERTIFICATE OF CORRECTION

| | | |
|---|---|---|
| PATENT NO. | : 8,706,122 B2 | |
| APPLICATION NO. | : 12/865424 | |
| DATED | : April 22, 2014 | |
| INVENTOR(S) | : Vikberg et al. | |

It is certified that error appears in the above-identified patent and that said Letters Patent is hereby corrected as shown below:

In the Specification

Column 5, Line 52, delete "request (TAM)" and insert -- request (IAM) --, therefor.

Column 6, Line 12, delete "JAM" and insert -- IAM --, therefor.

Column 6, Line 15, delete "JAM" and insert -- IAM --, therefor.

Signed and Sealed this
Second Day of September, 2014

Michelle K. Lee
*Deputy Director of the United States Patent and Trademark Office*